United States Patent
Palazzolo et al.

(10) Patent No.: US 10,077,691 B2
(45) Date of Patent: Sep. 18, 2018

(54) FLUID RETENTION AND FILTRATION ELEMENT FOR A HYDRAULIC TRANSFER CASE

(71) Applicant: BorgWarner Inc., Auburn Hills, MI (US)

(72) Inventors: Michael R. Palazzolo, Madison Heights, MI (US); Thomas P. Knox, Waterford, MI (US); Henrik Lundh, Melbystrand (SE)

(73) Assignee: BorgWarner Inc., Auburn Hills, MI (US)

( * ) Notice: Subject to any disclaimer, the term of this patent is extended or adjusted under 35 U.S.C. 154(b) by 341 days.

(21) Appl. No.: 14/952,248

(22) Filed: Nov. 25, 2015

(65) Prior Publication Data
US 2016/0208866 A1 Jul. 21, 2016

Related U.S. Application Data

(60) Provisional application No. 62/104,971, filed on Jan. 19, 2015.

(51) Int. Cl.
*F04B 53/18* (2006.01)
*F01M 9/10* (2006.01)
(Continued)

(52) U.S. Cl.
CPC ............ *F01M 9/106* (2013.01); *F04B 53/18* (2013.01); *F16D 25/123* (2013.01); *F16D 48/04* (2013.01); *F16H 57/04* (2013.01); *F16H 57/0424* (2013.01); *F16H 57/0436* (2013.01); *F16H 57/0452* (2013.01); *F16H 57/0453* (2013.01); *F16H 57/0461* (2013.01); *F01M 2011/005* (2013.01); *F01M 2011/0033* (2013.01); *F01M 2011/0041* (2013.01); *F01M 2011/0066* (2013.01); *F01M 2011/0083* (2013.01);
(Continued)

(58) Field of Classification Search
CPC ... F01M 2011/0033; F01M 2011/0041; F01M 2011/005; F01M 2011/0066; F01M 2011/0083; F01M 9/106; F16H 57/0453; F16H 57/0424; F16H 57/0423; Y10T 137/86212; Y10T 137/86348; Y10T 137/86284; Y10T 137/86204; F04B 53/18
See application file for complete search history.

(56) References Cited

U.S. PATENT DOCUMENTS 2,242,807 A * 5/1941 Austin ................... B01D 35/14
210/422
2,373,360 A * 4/1945 Walsh ...................... F01M 1/02
184/6.13
(Continued)

*Primary Examiner* — Atif Chaudry
(74) *Attorney, Agent, or Firm* — Young Basile Hanlon & MacFarlane, P.C.

(57) ABSTRACT

A lubrication and hydraulic actuation system for a transfer case (120) includes a pump (220), a pump sump (210) formed in the transfer case (120), and having an opening (430) in communication with an interior of the transfer case (120), and a fluid retention element (510, 710). The fluid retention element (510, 710) is disposed in the opening (430) of the pump sump (210) and has at least one baffle structure (550) to allow fluids to enter the pump sump (210) through the fluid retention element (510, 710) and restrain fluids from exiting the pump sump (210) through the fluid retention element (510, 710).

24 Claims, 5 Drawing Sheets

(51) Int. Cl.
*F16H 57/04* (2010.01)
*F16D 25/12* (2006.01)
*F16D 48/04* (2006.01)
*F01M 11/00* (2006.01)

(52) U.S. Cl.
CPC ... *F16H 57/0423* (2013.01); *Y10T 137/86204* (2015.04); *Y10T 137/86212* (2015.04); *Y10T 137/86284* (2015.04); *Y10T 137/86348* (2015.04)

(56) References Cited

U.S. PATENT DOCUMENTS

| | | | | |
|---|---|---|---|---|
| 5,279,391 | A * | 1/1994 | Ward | F01M 1/12 184/26 |
| 6,227,221 | B1 * | 5/2001 | Schmitz | F16D 31/02 137/1 |
| 2003/0209399 | A1 * | 11/2003 | Organek | F16D 27/115 192/35 |
| 2010/0212290 | A1 * | 8/2010 | Thiagarajan | F01N 3/2066 60/274 |

* cited by examiner

FLUID RETENTION AND FILTRATION ELEMENT FOR A HYDRAULIC TRANSFER CASE

This application claims the benefit of U.S. Provisional Application No. 62/104,971 filed on Jan. 19, 2015.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft and a secondary output shaft, with the secondary output shaft being driven selectively using a clutch. In addition, two speed transfer cases provide gear reduction to allow operation in a high range, which is typically a 1:1 drive ratio, or a low range, such as a 2:1 drive ratio.

Many of the components in a transfer case require lubrication and/or fluid pressure for hydraulic actuation. For example, in some transfer cases, a mode shift between a two-wheel drive mode and a four-wheel drive mode is performed by a hydraulically actuated clutch that requires pressurized hydraulic fluid in order to operate.

In order to pressurize the hydraulic fluid in the transfer case, the transfer case includes a pump. The fluid is directed to an inlet of the pump, where it is pressurized by the pump. The pressurized fluid is supplied to the components of the transfer case (e.g. by a passageway formed through a shaft), and then returns to a sump formed in the transfer case. When a vehicle is in motion, however, the forces experienced by the vehicle can cause the hydraulic fluid to move in a manner that prevents a constant flow of fluid into the inlet of the pump. If the pump is not receiving enough fluid at its inlet, pump starvation occurs, and the output of the pump may not be sufficient to lubricate and/or actuate components of the transfer case.

SUMMARY

One aspect of the disclosed embodiments is a lubrication and hydraulic actuation system for a transfer case that includes a pump, a pump sump formed in the transfer case, and having an opening in communication with an interior of the transfer case, and a fluid retention element. The fluid retention element is disposed in the opening of the pump sump and has at least one baffle structure to allow fluids to enter the pump sump through the fluid retention element and restrain fluids from exiting the pump sump through the fluid retention element.

Another aspect of the disclosed embodiments is a lubrication and hydraulic actuation system for a transfer case that includes a pump, a pump sump formed in the transfer case, and having an opening in communication with an interior of the transfer case, and a fluid retention element. The fluid retention element has a first end and a second end, a connecting portion formed at the first end and disposed in the opening of the pump sump, a fluid inlet formed at the first end to allow fluid to enter the fluid retention element from the interior of the transfer case, at least one baffle structure disposed in the fluid inlet to define an obstructed flow path to an interior space of the fluid retention element, a closed end surface at the second end of the fluid retention element, and one or more outlet ports that are positioned between the first end and the second end of the fluid retention element to allow fluid to flow from the interior space of the fluid retention element to the pump sump. The at least one baffle structure includes a first transverse wall that partially obstructs the interior space of the fluid retention element at the fluid inlet, and a second transverse wall that partially obstructs the interior space of the fluid retention element at the fluid inlet.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to a fluid retention and filtration element for a hydraulic transfer case.

Figure 1:
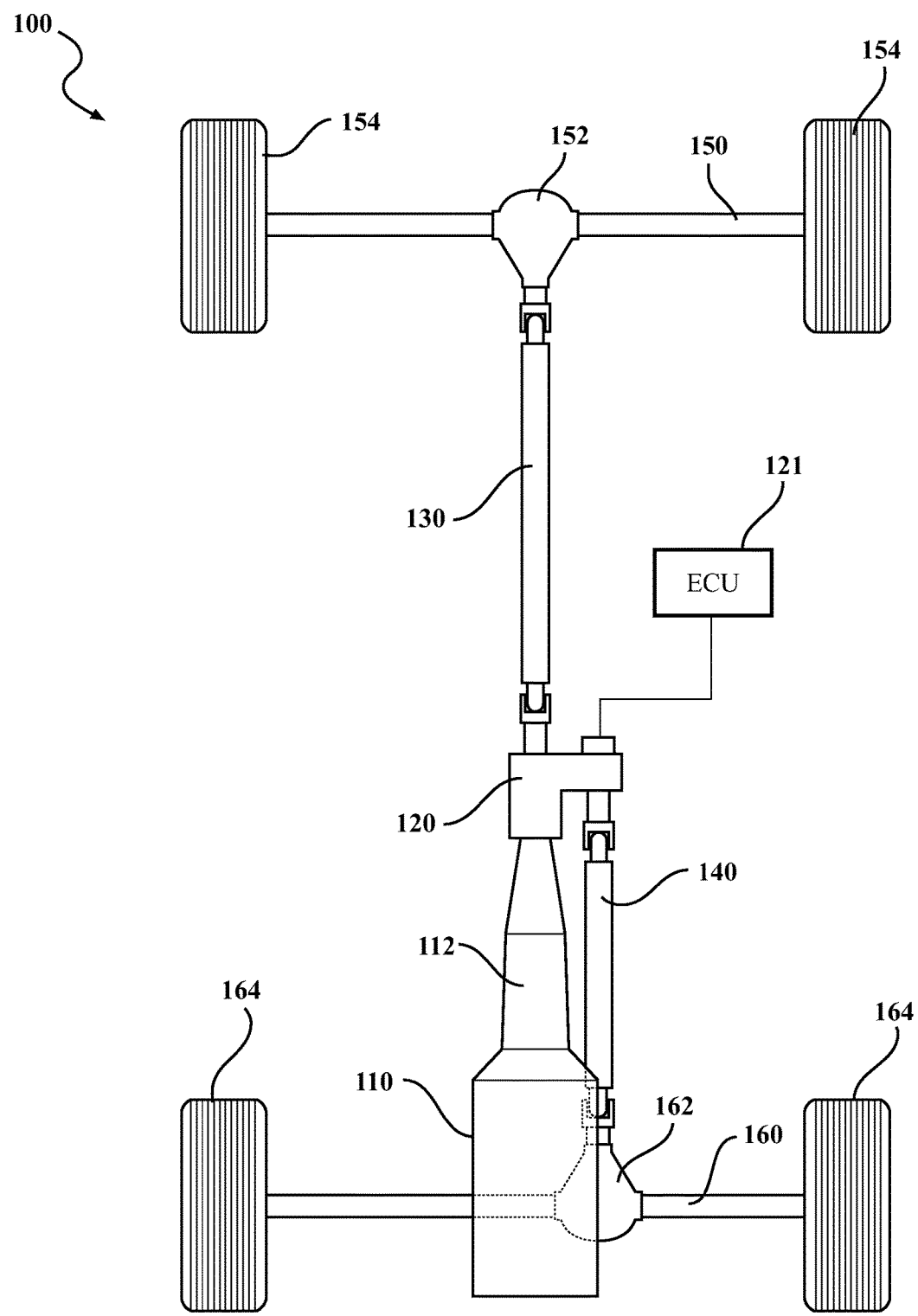
FIG. 1 is a plan view illustration showing a drivetrain that includes a transfer case.

FIG. 1 shows a drivetrain 100 for a four-wheel drive vehicle. The drivetrain 100 includes an engine 110 that is coupled to a transmission 112. The engine 110 is the prime mover of the drivetrain 100 and can be, as examples, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140.

The transfer case 120 can, in some implementations, include components that the transfer case to perform a mode shift between two or more different modes. For example, the transfer case 120 can allow operation in a rear-wheel drive mode, in which the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft, and the front driveshaft 140 is the secondary driveshaft. In other implementations, the front driveshaft 140 is the primary driveshaft, and the rear driveshaft 130 is the secondary driveshaft, and the transfer case 120 performs a mode shift between a front-wheel drive mode and a four-wheel drive mode. In other implementations, the transfer case 120 does not include components that allow a mode shift, and the transfer case 120 constantly provides driving power to both of the rear driveshaft 130 and the front driveshaft 140.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 121 that provides signals to components of the transfer case 120 to cause the mode shift and/or the range shift. In other implementations, the mode shift and/or the range shift can be actuated mechanically such as by a driver-operated lever that is mechanically connected to a component of the transfer case 120.

The rear driveshaft 130 provides driving power to a rear axle 150 via a rear differential 152. The rear axle 150 can be, as examples, a solid axle or a pair of independent half axles. The rear axle 150 provides driving power to a pair of rear wheels 154 that are fitted with tires.

The front driveshaft 140 provides driving power to a front axle 160 via a front differential 162. The front axle 160 can be, as examples, a solid axle or a pair of independent half axles. The front axle 160 provides driving power to a pair of front wheels 164 that are fitted with tires.

Figure 2:
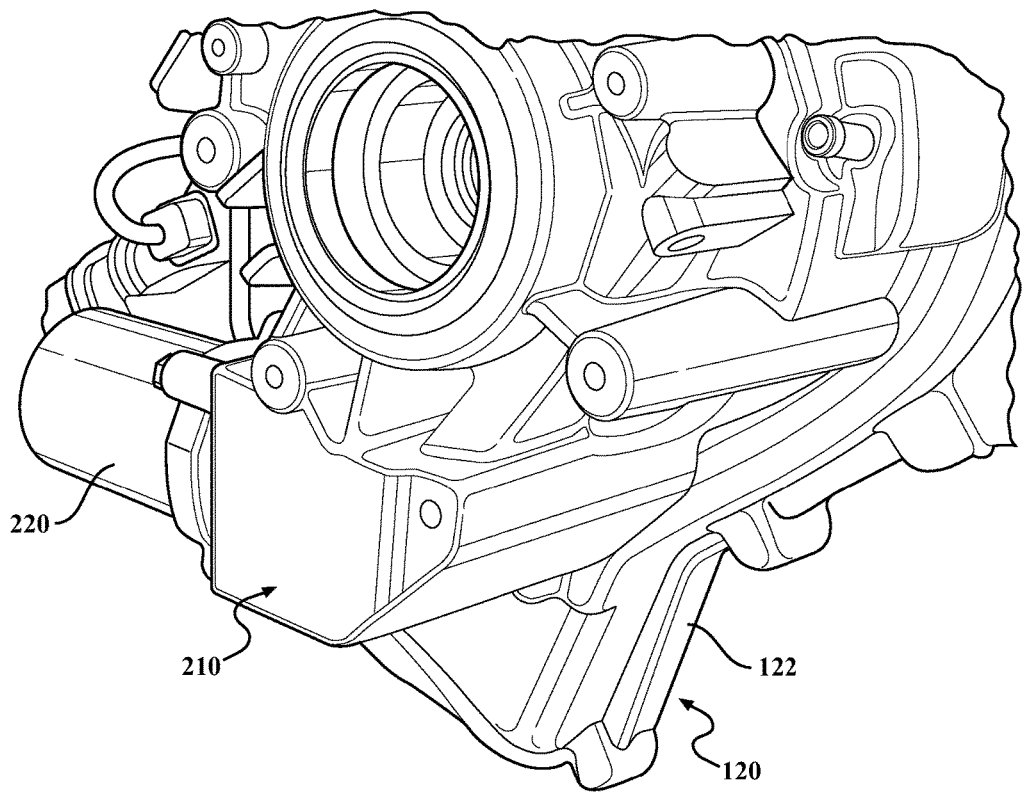
FIG. 2 is a rear perspective view of the transfer case.

FIG. 2 is a rear perspective view of the transfer case 120. The transfer case 120 includes a housing 122. A pump sump 210 is defined in the housing 122 of the transfer case 120. The pump sump 210 is an area within the transfer case 120 in which fluid (such as transfer case fluid or automatic transmission fluid) is able to collect for pumping by a pump 220 that has a pump inlet (not shown) in communication with the interior of the pump sump 210. The pump sump 210 can be a substantially enclosed space that is separate from the remainder of the interior of the transfer case 120.

Figure 3:
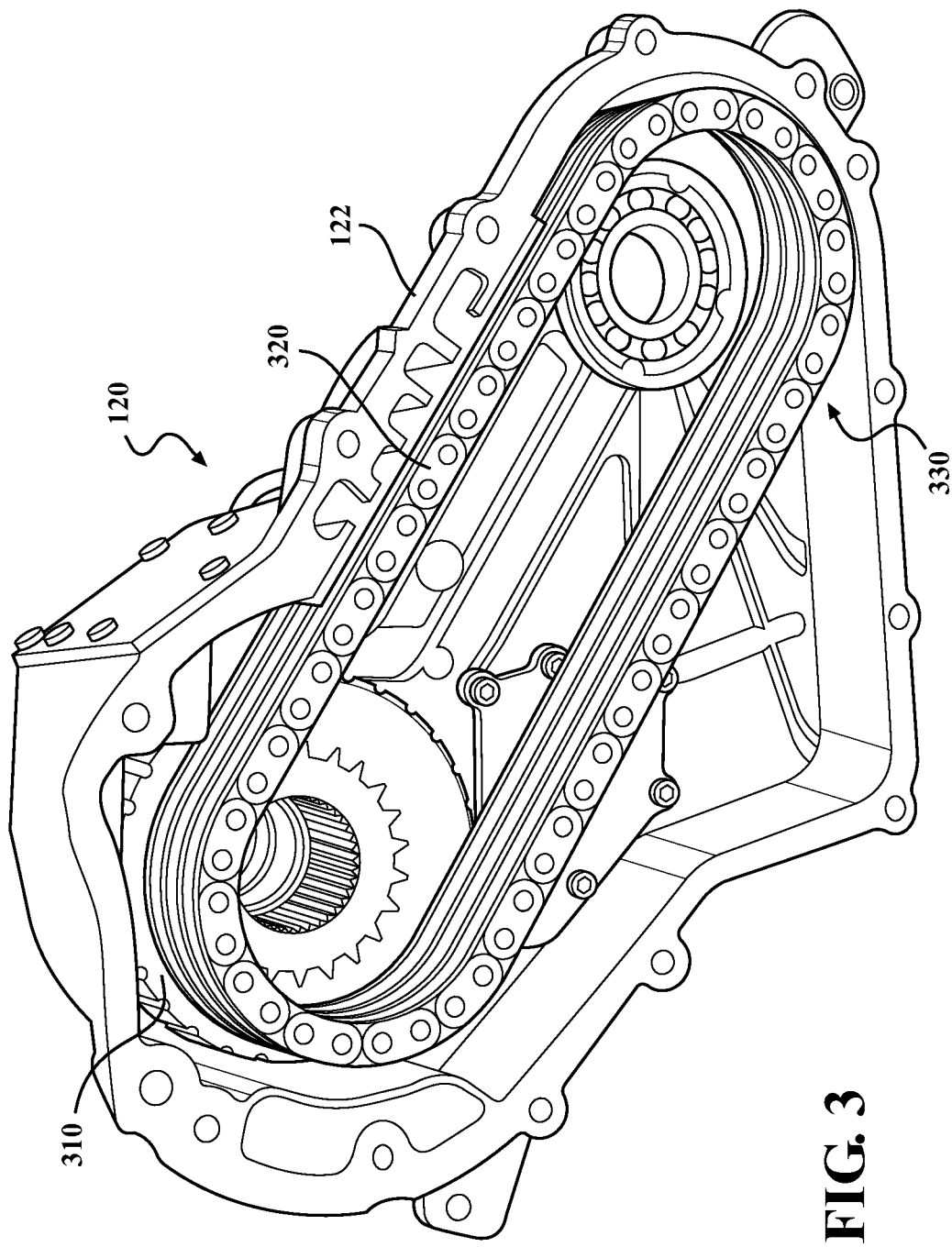
FIG. 3 is a front perspective view showing internal components of the transfer case.
Figure 4:
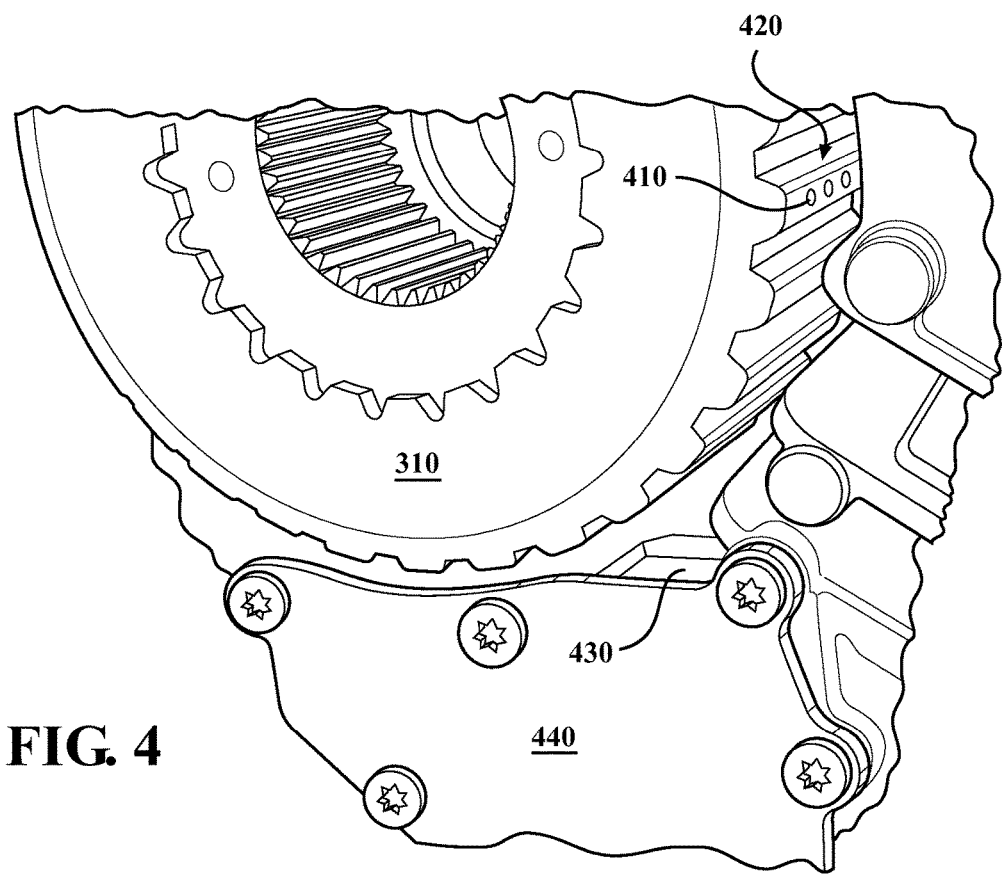
FIG. 4 is a detail view showing an inlet area of a pump sump.

As seen in FIG. 3, the pump sump 210 is positioned below a hydraulically actuated clutch 310 of the transfer case 120. The pump 220 is operable to provide fluid to the clutch 310 for use in lubrication of the clutch 310 and as a source of fluid pressure for hydraulic action of the clutch 310. A chain 320 is connected to the primary and secondary shafts (not shown) of the transfer case 120 by sprockets (not shown) for driving the secondary shaft when the clutch 310 is engaged. As the chain 320 is driven in a clockwise direction in FIG. 3, the chain 320 picks up fluid in a transfer case sump area 330 near the secondary shaft. Some of the fluid carried by the chain 320 enters the clutch 310 and subsequently exits the clutch 310 via radial ports 410, as shown in FIG. 4.

The fluid that exits the clutch 310 through the radial ports 410 is deposited in an upper area 420 of the housing 122 of the transfer case 120, where it drains to an inlet area of the pump sump 210 at an opening 430. The opening 430 is formed through a top surface of the pump sump 210 and leads from the interior of the transfer case to the interior of the pump sump 210. In the illustrated implementation, the opening 430 is upward facing, and is positioned adjacent to an axial end of the pump sump 210, which is closed with respect to the remainder of the interior of the transfer case 120 by a cover plate 440. The cover plate 440 is removably attached to the housing 122 by conventional fasteners.

Figure 5:
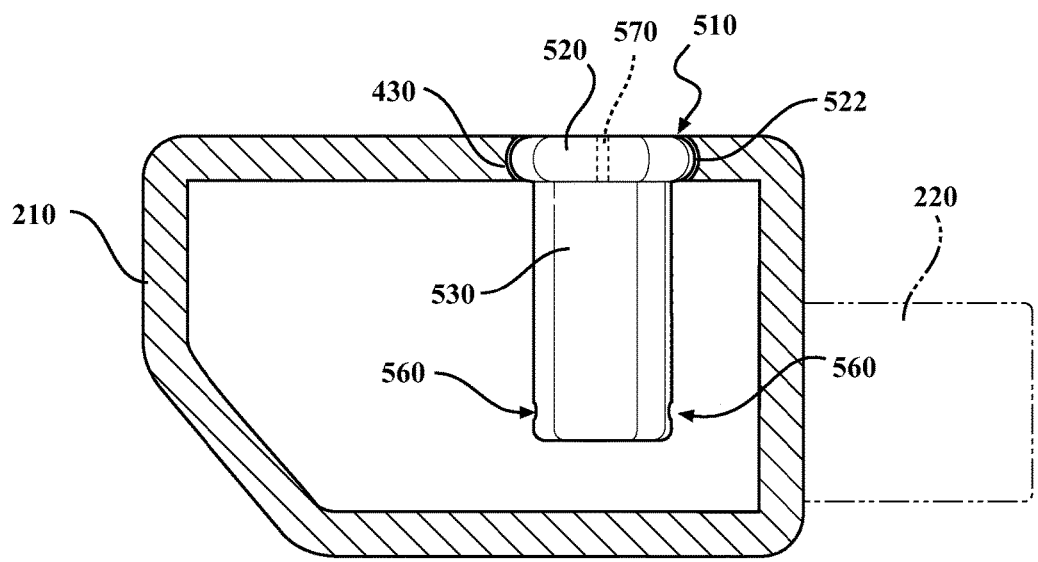
FIG. 5 is an end view of the pump sump showing a fluid retention element.

FIG. 5 shows the pump sump 210 with the cover plate 440 removed. A fluid retention element 510 is at least partially disposed within the pump sump 210. The fluid retention element 510 is configured to allow fluid to drain from the upper area 420 of the housing 122 into the pump sump 210 while impeding flow of fluid back into the upper area 420 of the housing 122. This allows the fluid to be supplied to and retained in the pump sump 210 regardless of tilting or lateral acceleration experienced by the vehicle.

A connecting portion 520 is formed at a first end of the fluid retention element 510. The connecting portion 520 is disposed in the opening 430 of the pump sump 210 and engages the opening 430 in order to secure the connecting portion 520 to the pump sump 210 in a manner that resists movement of the connecting portion 520 with respect to the opening 430 of the pump sump 210. The connecting portion 520 can be sized such that it occupies the entirety of the opening 430.

In the illustrated example, the fluid retention element 510 extends along an axis, and the connecting portion 520 is in the form of a flange that extends transverse to the axis of the fluid retention element 510. An outer periphery 522 of the connecting structure includes a geometric configuration that is complementary to a geometric configuration of the opening 430 in order to hold the connecting portion 520 within the opening 430. For example, the outer periphery 522 of the connecting portion 520 can include convex surfaces, while the opening 430 can include concave surfaces, such that the convex surfaces of the outer periphery 522 engage the concave surfaces of the opening 430 to prevent the connecting portion 520 from moving in or out of the opening 430 in the axial direction of the fluid retention element 510 when the cover plate 440 is connected to the pump sump. When the cover plate 440 is removed from the pump sump 210, the fluid retention element 510 can be inserted into or removed from the opening 430 by moving it in the axial direction of the pump sump 210, which is generally perpendicular to the axial direction of the fluid retention element 510.

Figure 6:
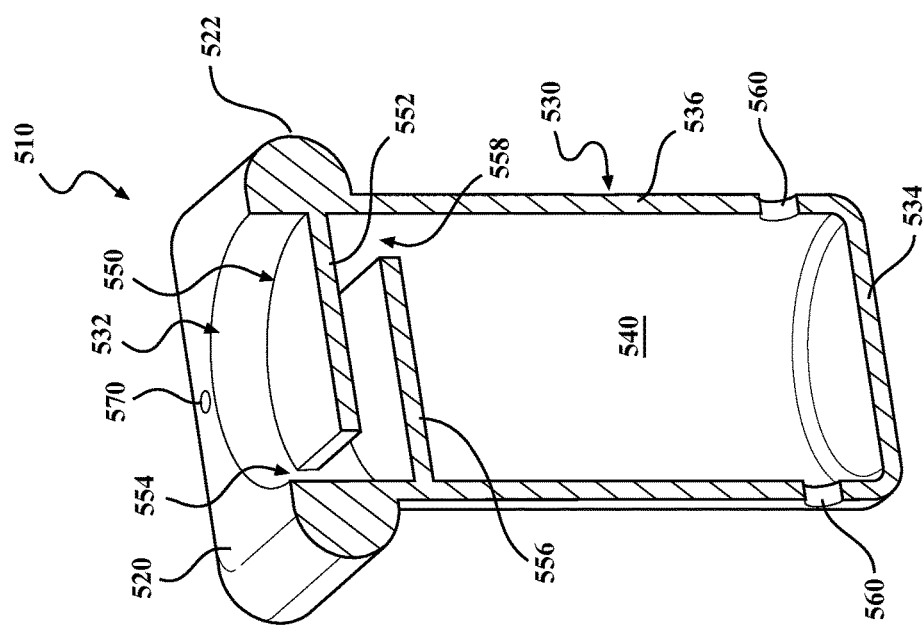
FIG. 6 is a cross-section view of the fluid retention element.

As best shown in FIG. 6, the fluid retention element 510 includes a body portion 530 that is connected to the connecting portion 520. When the connecting portion 520 of the fluid retention element 510 is installed in the opening 430, the body portion 530 is disposed within the pump sump 210. Fluid that enters the fluid retention element 510 is retained within the body portion 530 of the fluid retention element 510 prior to exiting into the remainder of the pump sump 210.

The body portion 530 of the fluid retention element 510 is a substantially hollow structure that extends outward from the connecting portion 520 in the axial direction of the fluid retention element 510. In the illustrated example, the body portion 530 is a tubular member having a circular cross-section when viewed in the axial direction of the fluid retention element 510. Other cross-sectional shapes could be utilized, such as oval, square, or rectangular. The hollow structure of the body portion 530 defines an interior space 540 for the fluid retention element 510. The interior space 540 extends from the first end of the fluid retention element 510 to a second end of the fluid retention element 510. In particular, a fluid inlet 532 is formed at the first end of the fluid retention element 510 and extends through the connecting portion 520 in the axial direction of the fluid retention element 510. At the second end of the fluid retention element 510, a closed end surface 534 of the body portion 530 extends transverse to the axial direction of the fluid retention element 510.

A baffle structure 550 is positioned in the interior space 540 of the body portion 530. The baffle structure 550 defines an obstructed flow path at the fluid inlet 532 in order to allow fluids to enter the interior space 540 at the fluid inlet 532 but to simultaneously restrain fluids from exiting the interior space 540 of the fluid retention element 510 at the fluid inlet 532. For example, the obstructed flow path can be defined by a structure that prevents fluid from entering or exiting the interior space 540 along a straight line.

In the illustrated example, the baffle structure 550 includes a first transverse wall that extends transverse to the axial direction of the fluid retention element 510 and obstructs a majority of the cross-sectional area of the interior space 540. The first transverse wall 552 does not, however, fully obstruct the interior space 540. Instead, the baffle structure 550 partially obstructs the interior space 540 such that a first port 554 is defined by the first transverse wall 552 and allows fluid to travel past the first transverse wall 552 in the axial direction. A second transverse wall 556 is also positioned within the interior space 540 of the body portion 530 at a position that is adjacent to the first transverse wall 552 and between the first transverse wall 552 and the second end of the fluid retention element 510. Like the first transverse wall 552, the second transverse wall 556 defines a second port 558 through which fluid can flow in the axial direction of the fluid retention element 510.

The first port 554 and the second port 558 are axially misaligned. The first port 554 and the second port 558 can be axially misaligned at least by a distance that causes no axial overlap of the first port 554 and the second port 558 such that a line extending in the axial direction of the fluid retention element 510 would not pass through both the first port 554 and the second port 558. The axial misalignment of the first port 554 and the second port 558 can be sufficient to prevent construction of an imaginary straight line that would pass from the unobstructed part of the interior space 540 through the first port 554, the second port 558, and then exit the fluid inlet 532. Thus, the configuration of the baffle structure 550 is made by way of example only, and persons of ordinary skill in the art will understand that numerous other baffle structures can be utilized that will allow entry of fluid into the interior space 540 while restricting exit of fluid from the interior space 540.

To allow fluid to exit the interior space 540 of the fluid retention element 510 and enter the pump sump 210, one or more outlet ports 560 are formed through a peripheral wall 536 of the body portion 530. In the illustrated example, two outlet ports 560 are formed through the peripheral wall 536 of the body portion 530. A lesser or greater number of outlet ports 560 can be provided. The outlet ports 560 are spaced apart from the second end of the fluid retention element 510 to allow debris to settle in the interior space 540 of the fluid retention element 510 between the closed end surface 534 and the outlet ports 560. Thus, the distance between the closed end surface 534 and the outlet ports 560 can be selected based on the amount of debris expected in the fluid being pumped, as well as the expected angles and forces that the transfer case 120 will be subjected to during use. Generally, the distance between the outlet ports 560 and the closed end surface 534 will be less than the distance between the outlet ports 560 and the baffle structure 550.

As the fluid exits the outlet ports 560 of the fluid retention element 510, it enters the pump sump 210. To prevent formation of an air bubble within the pump sump 210 and to allow filling of the pump sump 210 by the fluid, a vent can be provided near a high point of the pump sump 210 for allowing air to pass from the pump sump 210 into the remainder of the interior of the transfer case 120. As one example, a vent passage 570 can be formed through the fluid retention element 510. The vent passage 570 extends from a first end that is in communication with the interior of the transfer case 120 to a second end that is in communication with the pump sump 210 for venting air from the pump sump 210. In the illustrated example, the vent passage 570 extends from a top surface of the connecting portion 520 to a bottom surface of the connecting portion 520. As another example, a vent passage can be formed through the wall of the pump sump 210 near a high point of the pump sump 210. Other configurations could be utilized for the vent passage 570.

In operation, the fluid retention element 510 allows fluid to enter from the interior of the transfer case 120 via the fluid inlet 532. The fluid then passes the baffle structure 550 via the obstructed flow path defined through the baffle structure 550 such as by the first transverse wall 552 and the second transverse wall 556. After passing the baffle structure 550, the fluid is retained within the interior space 540 of the fluid retention element 510 for a period of time before exiting via the outlet ports 560 during the time in which the fluid is retained within the interior space 540, some of the debris present in the fluid may settle within the interior space 540 in the area adjacent to the closed end surface 534, where the debris remains as the remainder of the fluid exits the outlet ports 560, and passes into the pump sump 210.

Figure 7:
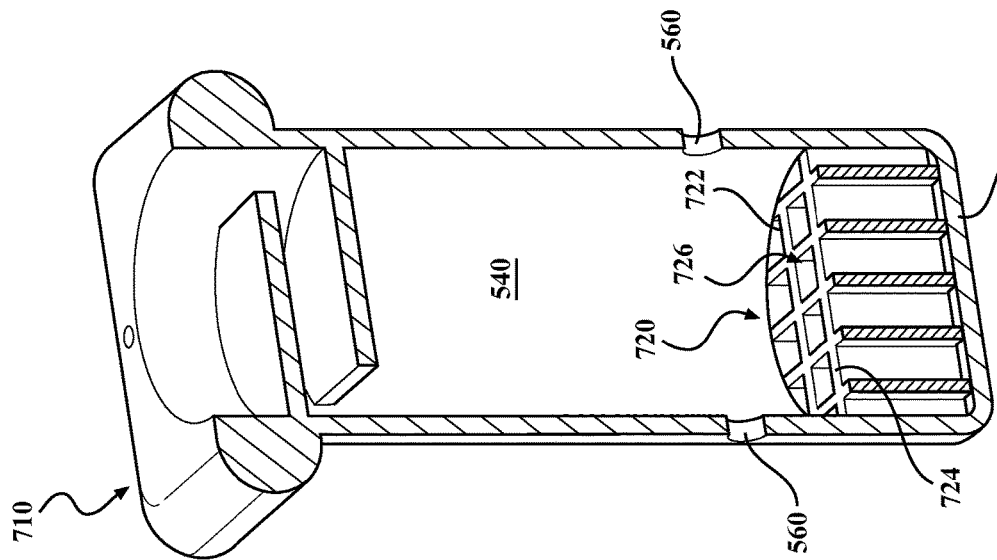
FIG. 7 is a cross-section view of a fluid retention element according to an alternative implementation.

FIG. 7 shows a fluid retention element 710 according to an alternative implementation. The fluid retention element 710 is identical to the fluid retention element 510 except that the distance between the closed end surface 534 and the outlet ports 560 is increased, and a divider structure 720 is positioned in the interior space 540 between the outlet ports 560 and the closed end surface 534. The divider structure 720 subdivides the interior of the fluid retention element into a plurality of smaller spaces in the area below the outlet ports. In the illustrated example, the divider structure 720 includes a first plurality of upstanding planar members 722 and a second plurality of upstanding planar members 724 that are arranged in an intersecting manner, such as at right angles with respect to one another, in a grid-like arrangement. Together, the first plurality of upstanding planar members 722 and the second plurality of upstanding planar members 724 define axially extending apertures 726. When fluid is retained within the interior space 540, the debris within the fluid can settle within the apertures 726. The apertures 726 help retain the debris within the interior space 540 so that it does not exit the interior space 540 via the outlet ports 560. Other geometric arrangements can be utilized to subdivide the area below the outlet ports 560. As one example, the divider structure 720 could include only the first plurality of upstanding planar members 722 while omitting the second plurality of upstanding planar members 724. Operation of the fluid retention element 710 is as described with respect to the fluid retention element 510.

While the disclosure has been made in connection with what is presently considered to be the most practical and preferred implementation, it should be understood that the disclosure is intended to cover various modifications and equivalent arrangements.

The invention claimed is:

1. A lubrication and hydraulic actuation system for a transfer case, comprising:
 a pump;
 a pump sump formed in the transfer case, and having an opening in communication with an interior of the transfer case; and
 a fluid retention element disposed in the opening of the pump sump such that fluids enter the pump sump through the fluid retention element, the fluid retention element including at least one baffle structure configured and dimensioned to interrupt fluid flow through the fluid retention element such that fluid flows through fluid retention element along a tortuous path to restrain fluids from exiting the pump sump through the fluid retention element.

2. The lubrication and hydraulic actuation system of claim 1, wherein the fluid retention element has a first end, a second end, and a connecting portion formed at the first end and disposed in the opening of the pump sump.

3. The lubrication and hydraulic actuation system of claim 2, wherein the fluid retention element includes a vent passage that extends through the connecting portion from a first end that is in communication with the interior of the transfer case to a second end that is in communication with the pump sump for venting air from the pump sump.

4. The lubrication and hydraulic actuation system of claim 2, wherein the fluid retention element has a fluid inlet formed at the first end to allow fluid to enter the fluid retention element from the interior of the transfer case.

5. The lubrication and hydraulic actuation system of claim 4, wherein the at least one baffle structure is at least partially disposed in the fluid inlet of the fluid retention element.

6. The lubrication and hydraulic actuation system of claim 5, wherein the fluid retention element has one or more outlet ports that are positioned between the first end and the second end of the fluid retention element to allow fluid to flow from the interior space of the fluid retention element to the pump sump.

7. The lubrication and hydraulic actuation system of claim 6, wherein the one or more outlet ports of the fluid retention element are spaced from the second end of the fluid retention element to allow debris to settle in the interior space of the fluid retention element.

8. The lubrication and hydraulic actuation system of claim 7, wherein a first distance between the first end of the fluid retention element and the one or more outlet ports is greater than a second distance between the second end of the fluid retention element and the one or more outlet ports.

9. The lubrication and hydraulic actuation system of claim 7, wherein a divider structure is positioned in the interior space of the fluid retention element between the one or more outlet ports and the second end of the fluid retention element.

10. The lubrication and hydraulic actuation system of claim 9, wherein the divider structure subdivides the interior space of the fluid retention element into a plurality of smaller spaces between the one or more outlet ports and the second end of the fluid retention element.

11. The lubrication and hydraulic actuation system of claim 1, wherein the at least one baffle structure includes a first transverse wall that partially obstructs fluid flow at a fluid inlet of the fluid retention element and a second transverse wall that partially obstructs fluid flow through an interior space of the fluid retention element.

12. The lubrication and hydraulic actuation system of claim 11, wherein the first transverse wall defines a first port to allow fluid to flow past the first transverse wall and the second transverse wall defines a second port to allow fluid to flow past the second transverse wall.

13. The lubrication and hydraulic actuation system of claim 12, wherein the first and second ports are spaced axially along a central longitudinal axis of the fluid retention element.

14. The lubrication and hydraulic actuation system of claim 13, wherein the first and second ports are spaced laterally with respect to the central longitudinal axis of the fluid retention element such that the first and second ports are axially misaligned.

15. The lubrication and hydraulic actuation system of claim 14, wherein the first port defines inner and outer lateral ends and the second port defines inner and outer lateral ends, the first and second ports being positioned such that the inner ends of the first and second ports are spaced laterally with respect to the central longitudinal axis of the fluid retention element to eliminate any overlap between the first and second ports.

16. A lubrication and hydraulic actuation system for a transfer case, comprising:
a pump;
a pump sump formed in the transfer case, and having an opening in communication with an interior of the transfer case; and
a fluid retention element disposed in the opening of the pump sump and having at least one baffle structure to allow fluids to enter the pump sump through the fluid retention element and restrain fluids from exiting the pump sump through the fluid retention element, wherein the fluid retention element has a first end, a second end, and a connecting portion formed at the first end and disposed in the opening of the pump sump, wherein the fluid retention element has a fluid inlet formed at the first end to allow fluid to enter the fluid retention element from the interior of the transfer case, wherein the at least one baffle structure is disposed in the fluid inlet of the fluid retention element to define an obstructed flow path to an interior space of the fluid retention element, wherein the at least one baffle structure includes a first transverse wall that partially obstructs the interior space of the fluid retention element at the fluid inlet, and a second transverse wall that partially obstructs the interior space of the fluid retention element at the fluid inlet.

17. The lubrication and hydraulic actuation system of claim 16, wherein a first port is defined by the first transverse wall to allow fluid to flow past the first transverse wall, a second port is defined by the second transverse wall to allow fluid to flow past the second transverse wall.

18. The lubrication and hydraulic actuation system of claim 17, wherein the first port is axially misaligned relative to the second port.

19. The lubrication and hydraulic actuation system of claim 18, wherein the axial misalignment of the first port relative to the second port is at least by a distance that causes no axial overlap of the first port and the second port.

20. A lubrication and hydraulic actuation system for a transfer case, comprising:
a pump;
a pump sump formed in the transfer case, and having an opening in communication with an interior of the transfer case; and
a fluid retention element disposed in the opening of the pump sump and having at least one baffle structure to allow fluids to enter the pump sump through the fluid retention element and restrain fluids from exiting the pump sump through the fluid retention element, wherein the fluid retention element has a first end, a second end, and a connecting portion formed at the first end and disposed in the opening of the pump sump, wherein the fluid retention element has a fluid inlet formed at the first end to allow fluid to enter the fluid retention element from the interior of the transfer case, wherein the at least one baffle structure is disposed in the fluid inlet of the fluid retention element to define an obstructed flow path to an interior space of the fluid retention element, wherein the fluid retention element has one or more outlet ports that are positioned between the first end and the second end of the fluid retention element to allow fluid to flow from the interior space of the fluid retention element to the pump sump, wherein the one or more outlet ports of the fluid retention element are spaced from the second end of the fluid retention element to allow debris to settle in the interior space of the fluid retention element.

21. The lubrication and hydraulic actuation system of claim 20, wherein a first distance between the first end of the fluid retention element and the one or more outlet ports is greater than a second distance between the second end of the fluid retention element and the one or more outlet ports.

22. The lubrication and hydraulic actuation system of claim 20, wherein a divider structure is positioned in the interior space of the fluid retention element between the one or more outlet ports and the second end of the fluid retention element.

23. The lubrication and hydraulic actuation system of claim 22, wherein the divider structure subdivides the interior space of the fluid retention element into a plurality of smaller spaces between the one or more outlet ports and the second end of the fluid retention element.

24. A lubrication and hydraulic actuation system for a transfer case, comprising:

a pump;

a pump sump formed in the transfer case, and having an opening in communication with an interior of the transfer case; and a fluid retention element having a first end and a second end, a connecting portion formed at the first end and disposed in the opening of the pump sump, a fluid inlet formed at the first end to allow fluid to enter the fluid retention element from the interior of the transfer case, at least one baffle structure disposed in the fluid inlet to define an obstructed flow path to an interior space of the fluid retention element, a closed end surface at the second end of the fluid retention element, and one or more outlet ports that are positioned between the first end and the second end of the fluid retention element to allow fluid to flow from the interior space of the fluid retention element to the pump sump, wherein the at least one baffle structure includes a first transverse wall that partially obstructs the interior space of the fluid retention element at the fluid inlet, and a second transverse wall that partially obstructs the interior space of the fluid retention element at the fluid inlet.

* * * * *